United States Patent [19]

Lanfranca et al.

[11] Patent Number: 4,805,130
[45] Date of Patent: Feb. 14, 1989

[54] ARITHMETIC AND LOGIC CIRCUIT STAGE

[75] Inventors: Michel J. Lanfranca; Jean-Michel J. Labrousse, both of Paris; Christian M. Deneuchatel, Velizy, all of France

[73] Assignee: U.S. Philips Corporation, New York, N.Y.

[21] Appl. No.: 30,946

[22] Filed: Mar. 26, 1987

[30] Foreign Application Priority Data

Mar. 28, 1986 [FR] France ................... 86 04506

[51] Int. Cl.⁴ .............................. G06F 7/50
[52] U.S. Cl. ................................. 364/786
[58] Field of Search ............ 364/736, 786, 787; 307/465

[56] References Cited

U.S. PATENT DOCUMENTS 4,563,751 1/1986 Barker ..................... 364/786
4,621,338 11/1986 Uhlenhoff ............... 364/786 X

FOREIGN PATENT DOCUMENTS 2649968 5/1978 Fed. Rep. of Germany ...... 364/786
60-134932 7/1985 Japan ..................... 364/786

OTHER PUBLICATIONS

Ong et al, "A Comparison of ALV Structures for VLSI Technology", 6th Symposium on Computer Arithmetics, Jun. 20–22, 1983 in Aarhus (DK), published by IEEE Computer Society.

Primary Examiner—Gary V. Harkcom
Assistant Examiner—Tan V. Mai
Attorney, Agent, or Firm—Steven R. Biren

[57] ABSTRACT

A circuit for performing operations on two bits (A,B), including the processing of a carry from a preceding circuit ($\overline{CIN}$) and transmitting it to a subsequent circuit ($\overline{COUT}$). The circuit includes a network which is formed by MOS transistors which can be programmed via programming lines and which supplies a logic combination. An exclusive carry-propagation-generation device is formed by three MOS transistors which are connected in series between a carry-propagation line and ground and whose gates are connected to one of the bits to be processed, to the logic combination, and to a carry inhibit line, respectively.

4 Claims, 2 Drawing Sheets

ARITHMETIC AND LOGIC CIRCUIT STAGE

BACKGROUND OF THE INVENTION

The invention relates to a circuit stage for performing operations on the basis of arithmetical and/or logic input data A and B while taking into account any carry from a preceding stage, and for supplying an operation result as well as a carry, if any, to be applied to the next stage, which circuit stage includes a programmable data preprocessing device which is formed by a network of MOS transistors which supply the logic combination $\bar{P} = \alpha \cdot A \cdot B + \beta \cdot A \cdot \bar{B} + \gamma \cdot \bar{A} \cdot B + \delta \cdot \bar{A} \cdot \bar{B}$, on a "logic connection", where $\alpha, \beta, \gamma, \delta$ are programming parameters, a carry-propagation device which is formed by a MOS transistor inserted in a chain for propagating the carry from one stage to the next stage, the output of said chain being, moreover, precharged during a clock period in each stage, an exclusive carry propagation-generation device which comprises a transistor for discharging the chain, and a device for generating the logic result of the circuit.

A circuit of this kind is used in arithmetic and logic units of calculators, notably in microprocessors.

Circuits of this kind are described in a paper "A comparison of ALU structures for VLSI technology" by Ong and Atkins, presented at the "6th Symposium on Computer Arithmetics", held from June 20 to 22, 1983, in Aarhus (DK), and published by I.E.E.E. Computer Society; this paper discloses a device which comprises a programmable logic block for preprocessing data in order to calculate the carry, including a carry-propagation chain, and another logic block for calculating a result.

SUMMARY OF THE INVENTION

The invention aims to simplify the construction of an arithmetic and logic circuit comprising the above devices. The object is to achieve a minimum surface area for a semiconductor crystal in which the circuit is integrated.

To achieve this, the circuit in accordance with the invention is characterized in that the exclusive carry propagation-generation device is formed by at least two MOS transistors which are connected in series between the output of the carry-propagation chain and a point carrying a potential which corresponds to the logic level "low", the gates of said transistors being connected to one of the data inputs and the connection carrying said logic combination, respectively, the gate of the carry-propagation transistor being connected, via an inverter, to said connection carrying the logic combination.

Thus, instead of a circuit for calculating a logic combination in order to supply the result of the stage and another circuit for calculating the carry, use is made of an already existing circuit, to which only one transistor is added in order to perform the entire function. The invention thus takes into account the interaction between the various circuits and reduces the overall circuitry by elimination of a logic network. This will be described in detail hereinafter.

In the specific case where the circuit in accordance with the invention forms part of a logic carry-selection block for which purpose it comprises two carry-propagation chains and two carry-generation devices, it is characterized in that one of these two devices is formed by two of the above MOS transistors which are connected in series between the first propagation chain and the "low" logic potential, the gate of the transistor whose drain is connected directly to said chain being connected to said logic connection, the other generation device being formed by a single transistor whose gate is also connected to said logic connection and which is inserted between the other propagation chain and the source of the transistor whose drain is connected to the first propagation chain.

Thus, a carry-selection circuit is realized by adding only a single transistor to the carry-generation device.

BRIEF DESCRIPTION OF THE DRAWING

The invention will be described in detail hereinafter with reference to the accompanying diagrammatic drawings, in which.

DESCRIPTION OF THE PREFERRED EMBODIMENTS

Figure 1:
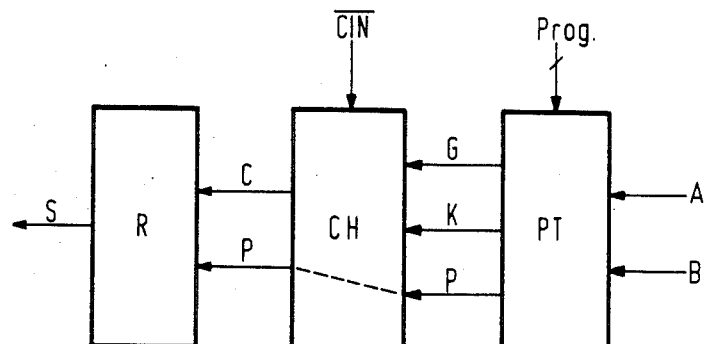
FIG. 1 shows a block diagram of a prior art circuit.

The circuit shown in FIG. 1 forms a stage of a unit which comprises a plurality of such stages. The unit processes two n-bit words and comprises n circuit stages of this type. Input A carries a bit of one of the two words which corresponds to the rank of the stage considered, and input B carries the corresponding bit of the other word.

In combination with the programming lines "Prog", the inputs A and B generate the signals which are supplied by the device PT:

P is the "propagation condition": a carry is propagated from the preceding stage to the next stage, G is the "generation condition": the carry on the output $\overline{COUT}$ of the stage considered is "active", regardless of the carry on the input $\overline{CIN}$ (the carry is active when $\overline{CIN}$ (or $\overline{COUT}$) is "low").

Sometimes there is also provided a signal K which results in the absence of a carry, regardless of the carry $\overline{CIN}$. However, this signal is redundant because it will be understood that, when P and G are both inactive, there should not be a carry.

A minimal version generally utilizes a device for controlling the carry propagation which is known as "Manchester carry ripple". The carry-propagation chain comprises simply a transistor which is controlled by the signal P and which is connected in series between $\overline{CIN}$ and $\overline{COUT}$ in order to control the propagation, and a transistor which is connected by the signal G and which is connected between $\overline{COUT}$ and a point carrying the logic level "low", generally referred to as "ground", in order to impose a "low" level at the output. If P and G are both zero, the output $\overline{COUT}$ is "high". Until now the approach adopted for constructing such a circuit consisted of the use of a logic assembly for generating the signal P and a second logic assembly for generating the signal G in the programmable device PT.

Finally, the device R is a circuit for calculating the result bit of the stage which utilizes the same signal P as the stage CH, in combination with a carry vector C.

Figure 2:
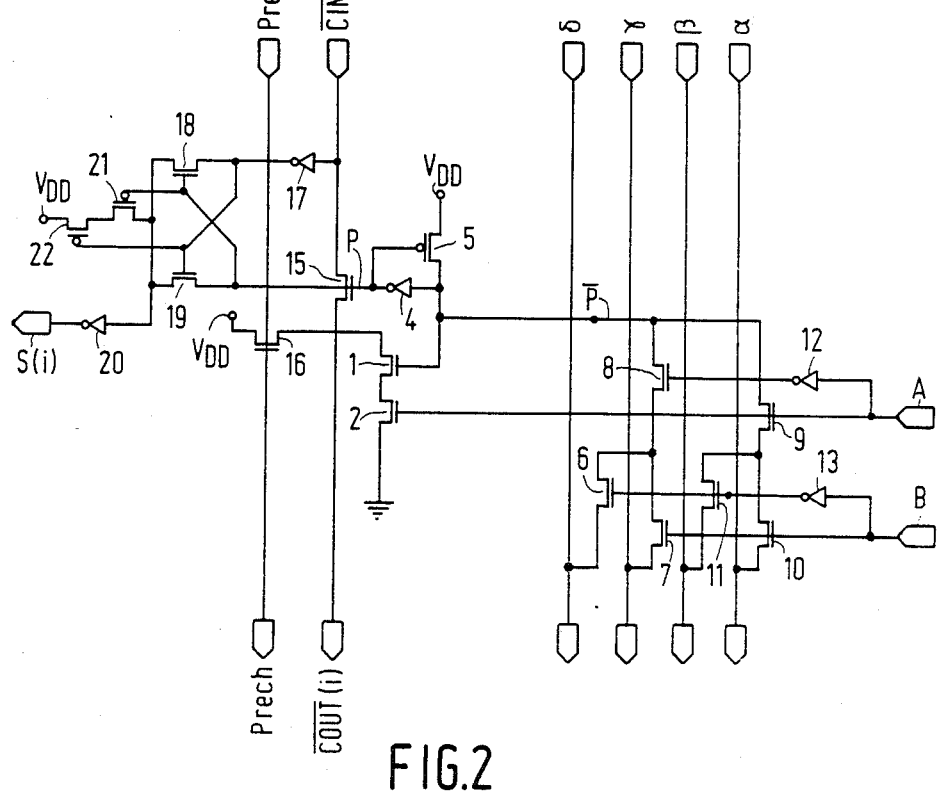
FIG. 2 shows an electrical diagram of a stage in accordance with the invention for carry propagation only.

FIG. 2 shows a detail of an embodiment in accordance with the invention in which two of the three blocks of FIG. 1 are interleaved.

The programming lines $\alpha$, $\beta$, $\gamma$, $\delta$ are connected to a network of logic gate, each of which is formed by an NMOS transistor; the line $\delta$ is connected to the source of the transistor 6; the line $\gamma$ is connected to the source of the transistor 7; the line $\beta$ is connected to the source of the transistor 11, and the line $\alpha$ is connected to the source of the transistor 10. The drain of the transistor 6 is connected to that of the transistor 7 and to the source of the transistor 8 whose drain is connected to a "logic connection" on which the signal P is generated. Moreover, the drain of the transistor 11 is connected to that of the transistor 10 and to the source of the transistor 9 whose drain is connected to the logic connection $\overline{P}$. The gates of the transistors 6 and 11 are connected to the binary input B via an inverter 13, the gate of the transistors 7 and 10 being connected to the input B, while that of the transistor 9 is connected to the binary input A and that of the transistor 8 is connected to the input A via an inverter 12.

Using exclusively the six transistors 6 to 11 and the two inverters 12, 13, the complete linear equation:

$$\overline{P} = \alpha \cdot A \cdot B + \beta \cdot A \cdot \overline{B} + \gamma \cdot \overline{A} \cdot B + \delta \cdot \overline{A} \cdot \overline{B}$$

can be realized.

A supplementary inverter 4 supplies the signal P. This inverter is fed back via a PMOS transistor 5 in order to enhance the "high" level of the signal. Thus, the input $\overline{P}$ of this inverter is connected to a source for a voltage having the "high" logic level ($V_{DD}$) via a transistor 5 whose polarity opposes that of the transistors of the logic and propagation network and whose gate is connected to the output of said inverter. The PMOS transistor 5 is active enough in order to provide a suitable "high" signal subsequent to the NMOS network; it is used instead of a static load or is connected to a clock.

The inverter 4 connects the logic line $\overline{P}$ to the gate of an NMOS transistor 15 which is arranged between the carry input $\overline{CIN}$ and the carry output $\overline{COUT}$ and which forms an element of a chain for propagating the carry from one stage to another.

The circuit is connected to a clock (not shown) via a line "Prech". During a first period this line carries the "high" logic level and the NMOS transistor 16 is turned on (its gate is connected to the line "Prech"), thus connecting a point having the "high" level (supply voltage $V_{DD}$), connected to its drain, to the output $\overline{COUT}$ connected to its source. During a second period, the line "Prech" is zero and the output $\overline{COUT}$ is separated from $V_{DD}$.

At that instant the logic operations of the circuit are executed. It will be understood that, when a "high" level is desired for $\overline{COUT}$, it suffices that the line $\overline{COUT}$ is not discharged; in other words, nothing need be done. Therefore, the signal K of FIG. 1 is not useful here. It is to be remembered that $\overline{CIN}$ and $\overline{COUT}$ are "low" when a carry is present.

The output $\overline{COUT}$ can be discharged via different means: either P=1 and a zero may be propagated on $\overline{CIN}$, or P=0 ($\overline{P}$=1) and an exclusive carry propagation-generation device, referred to as "carry generator", can generate a carry $\overline{COUT}$ while discharging the line $\overline{COUT}$.

This carry generator is formed by two NMOS transistors 1, 2 which are connected in series between the carry output $\overline{COUT}$ and a point carrying a potential which corresponds to the logic "low" level (ground), their gates being connected to one of the data inputs (A) and to the connection carrying said logic combination ($\overline{P}$), respectively. Moreover, a third transistor may in this case be connected in series with the transistors 1 and 2, its gate being connected to an inhibit line. This inhibit line serves to inhibit any formation of a carry by blocking the third transistor in each stage, regardless of the logic combination $\overline{P}$, for example in the case of logic instead of arithmetical operations. This inhibit line does not relate to the signal K of FIG. 1 which depends on the inputs A and B. In the case that the inhibit line is present and where the generation of a carry must be calculated, said third transistor is always turned on and has no effect whatsoever.

It can be readily verified that the above logic network and carry generator perform the following functions.

$$P = \alpha \cdot A \cdot B + \beta \cdot A \cdot \overline{B} + \gamma \cdot \overline{A} \cdot B + \delta \cdot \overline{A} \cdot \overline{B}$$

$$\overline{COUT} = \overline{(A \cdot \overline{P} \cdot I)} \cdot \overline{(P + \overline{CIN})}$$

or that COUT = $A \cdot I \cdot P + P \cdot CIN$, where I = Inhibit (in the case where said third transistor is connected in series with the transistor 1 and 2).

It is to be noted that the linear equation P ($\alpha$, $\beta$, $\gamma$, $\delta$) enables sixteen combinations: only eight combinations are actually utilized here, but a more universal circuit would also be feasible.

The following operation results are obtained:

| Programming lines | | | | Inhibit | S(i) | $\overline{COUT}$ | Carry generator | Logic signal $\overline{P}$ |
| $\alpha$ | $\beta$ | $\gamma$ | $\delta$ | | | | | |
|---|---|---|---|---|---|---|---|---|
| 1 | 0 | 0 | 1 | 1 | Addition | $\overline{A \cdot B} \cdot \overline{CIN} + \overline{A \cdot B}$ | A.B. | A.B. + $\overline{A \cdot B}$ = A or B excl. |
| 0 | 1 | 1 | 0 | 1 | Subtraction | $\overline{\overline{A} \cdot B} \cdot \overline{CIN} + \overline{\overline{A} \cdot B}$ | A.$\overline{B}$. | A.$\overline{B}$ + B.$\overline{A}$ |
| 0 | 1 | 0 | 1 | 1 | $\overline{A}$ shifted | $\overline{A}$ | A | if B = 0 |
| 1 | 1 | 0 | 0 | 0 | A | 1 | 0 | A |
| 0 | 0 | 0 | 1 | 0 | $\overline{A \text{ or } B}$ | 1 | 0 | $\overline{A} \cdot \overline{B}$ |
| 1 | 0 | 0 | 1 | 0 | $\overline{A \text{ or } B}$ excl. | 1 | 0 | A.B + $\overline{A} \cdot \overline{B}$ |

-continued

| Programming lines α | β | γ | δ | Inhibit | S(i) | $\overline{COUT}$ | Carry generator | Logic signal $\overline{P}$ |
|---|---|---|---|---|---|---|---|---|
| 0 | 1 | 1 | 1 | 0 | $\overline{A \text{ and } B}$ |   | 0 | $A.B$ |
| 1 | 1 | 0 | 1 | 0 | $\overline{A \text{ and } \overline{B}}$ | 1 | 0 | $A.\overline{B}$ |

It is to be noted that the logic equations defining $\overline{COUT}$ and $\overline{P}$ essentially differ. Therefore, in the prior art the transistor 1 (the only one present) has its gate connected to a second logic network which is of the same type as the network 6, 13 but whose logic function (truth table) is different. It has been found that actually it suffices to connect, in series with the transistor 1, a single transistor 2 whose gate is connected to A in order to generate the complex functions defining $\overline{COUT}$, that is to say for addition (line 1 of the table) as well as for subtraction (line 2) and shifting (line 3). It is to be noted that the gate of the transistor 2 could also be connected to B, provided that the terms of the subtraction are inverted and that use is made of the register supplying B when a shift is to be obtained.

As far as the line 3 is concerned, an alternative version which offers the same result consists in the use of the lines α, γ instead of the lines β, δ, but with B=1.

The last part of the circuit is formed by an Exclusive-OR assembly which is connected between CIN and P and which generates the logic result. The signal CIN is obtained on the output of the inverter 17 on the basis of $\overline{CIN}$. The signal CIN is applied to the gate of the NMOS transistor 19 and to the source of the NMOS transistor 18. The signal P is applied to the gate of the transistor 18 and to the source of the transistor 19. The drains of the two transistors are interconnected and connected to the result output S(i) via an inverter 20. Two PMOS transistors 21, 22, connected in series from $V_{DD}$, are connected to the common junction of the drains of the transistors 18, 19, their gates being connected to the signal P and to the signal CIN, respectively. When the two signals CIN and P are zero, the transistors 18, 19 are turned off and their drain is "attracted" to $V_{DD}$ by the transistors 21, 22 which are turned on because their polarity opposes that of the transistors 18, 19. When CIN and P are "high", the transistors 18, 19 are turned on so that they both conduct the "high" level. If CIN is "high" and P is "low", the transistor 19 transmits the zero of P, and if P is "high" and CIN is "low", the transistor 18 transmits the zero of CIN. Therefore, the output of the inverter 20 is "high" if the pair CIN-P has the values 0-1 or 1-0 and is "low" for 0-0 and 1-1. The output S(i) thus supplies the signal CIN⊕P.

Figure 3:
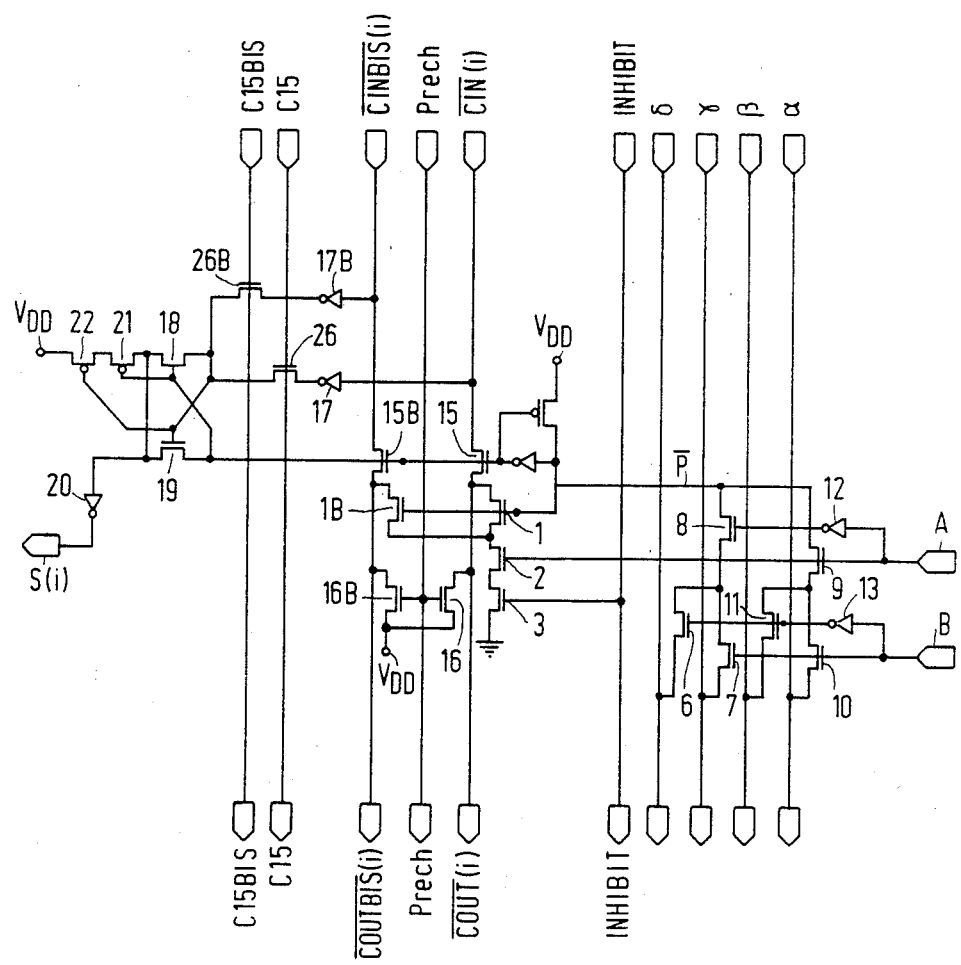
FIG. 3 shows an electrical diagram of a stage in accordance with the invention for carry selection.

FIG. 3 shows a circuit of the same type, but intended for realizing a carry-selection device. The circuit shown in FIG. 3 includes a third transistor 3 which is controlled by a signal INHIBIT and whose gate is connected to the inhibit line INHIBIT. Thus, instead of a chain for propagating the carry from one stage to the next stage where each stage must await the result from the preceding stage, there are now provided two chains, one of which introduces a carry while the other introduces a "noncarry". Thus, the calculations are performed in the relevant stage at the same time as in the preceding stage after which, the result (carry) of the preceding stage being available, it will merely be necessary to choose between the two chains. The circuit shown in FIG. 3 thus comprises two propagation chains which connect two carry inputs $\overline{CIN}$, $\overline{CINBIS}$ to two carry outputs $\overline{COUT}$, $\overline{COUTBIS}$.

The elements of FIG. 3 which correspond to those of FIG. 2 are denoted by the same reference numerals and will not be described again. The elements which are new in comparison with those of FIG. 2 but which have a similar function, are denoted by the same reference numeral, which is extended by the letter B. Thus, the device for generating the carry on the line $\overline{CIN}$, $\overline{COUT}$ is formed by three NMOS transistors 1, 2, 3 which are connected in series between the line $\overline{COUT}$ and ground. However, as is the case here, the transistor connected to the end of the line $\overline{COUT}$ must be the one whose gate is connected to the logic connection $\overline{P}$, while the order of the series connection of the two transistors 1 and 2 was indifferent in FIG. 2. Thus, the device for generating the carry for the line $\overline{COUTBIS}(i)$ can be formed only by a single NMOS transistor 1B whose gate is connected to the logic connection $\overline{P}$ and whose drain is connected to the propagation line $\overline{COUTBIS}(i)$ while its source is connected to that of the transistor 1 whose drain is connected to the carry-propagation line $\overline{COUT}(i)$. It is to be noted that another supplementary transistor 16B is nevertheless necessary in order to realize the precharging of the line $\overline{COUTBIS}$ from the line "Prech". The lines C15 and C15BIS and the transistors 26, 26B serve for making the described choice between the data carried by the lines $\overline{CIN}$, $\overline{CINBIS}$ for the calculation of the result S(i) of the stage. The lines C15 and C15BIS thus conduct the carry from the preceding stage, or a group of preceding stages, and the inverse of this carry, respectively, when the preceding stage has finished its calculations. The transistors 26 and 26B whose gates are connected to the line C15 and the line C15BIS, respectively, are connected between the output of the inverters 17 and 17B, respectively, and the source of the transistor 18. Depending on the carry from the preceding stage, therefore, the transistor 26 or the transistor 26B will be turned on, so that $\overline{CIN}(i)$ or $\overline{CINBIS}(i)$, respectively, will be selected, respectively.

The various inverters described above are not shown in detail; their realization is well known, for example from CMOS technology (using NMOS and PMOS transistors).

It will be apparent that the terms "high" and "low" signify "connected to supply voltage" and "connected to ground", respectively and that, if use were made of transistors having the reverse polarity, the level "high" would be high only as regards absolute value.

What is claimed is:

1. A circuit which forms a stage of a unit which comprises a plurality of such stages in order to perform operations on the basis of input data A and B while taking into account any carry (CIN) from a preceding stage, and for supplying an operation result and a carry ouput (COUT), if any, to be applied to the next stage, said circuit comprising a data preprocessing device which is formed by a network of MOS transistors which supply the logic combinations $\overline{P} = \alpha A \cdot B + \beta \cdot A \cdot \overline{B} + \gamma \cdot \overline{A} \cdot B + \delta \cdot \overline{A} \cdot \overline{B}$ on a logic connection ($\overline{P}$), where $\alpha$, $\beta$, $\gamma$, $\delta$, are programming parameters, a carry-propagation device which is formed by a MOS transistor inserted between a carry input and a carry output of a chain for propagating the carry from one stage to a next stage, the output of the chain being precharged during a clock period in each stage by an exclusive carry propagation-generation device, which comprises a transistor for discharging the chain, and a device for generating the logic result of the circuit, characterized in that the exclusive carry-propagation-generation device is formed by at least two MOS transistors (1, 2) which are connected in series between the output of the carry-propagation chain and a point carrying a potential at the low logic level, the gates of said two transistors being connected to one of the data inputs and the connection carrying said logic combination ($\overline{P}$), respectively, and an inverter, the gate of the carry-propagation transistor (15) being connected, by said inverter, to said connection carrying the logic combination.

2. A circuit as claimed in claim 1 for realizing a carry-selection device for, which comprises two carry-propagation chains (CIN, CINBIS) and two exclusive carry-propagation-generation devices, characterized in that one of these two devices is formed by two MOS transistors which are connected in series between the first propagation chain and the low logic potential, the gate of the transistor (1) whose drain is connected directly to said chain being connected to said logic connection ($\overline{P}$), the other exclusive carry propagation generation device being formed by a single transistor (1B) whose gate is also connected to said logic connection ($\overline{P}$) and which is inserted between the other propagation chain and the source of the transistor (1) whose drain is connected to the first propagation chain.

3. A circuit as claimed in claim 1 or 2, in which the network of MOS transistors is formed by four connections, each of which connects one of the four programming lines ($\alpha$, $\beta$, $\gamma$, $\delta$) to the connection varying said logic combination, each of said connections comprising at least the drain-source path of a MOS transistor, characterized in that two of the connections comprise two transistors which are connected in series, the other connections comprising only one transistor, for connecting a programming line to the center point of the two transistors of one of the two-transistor connections.

4. A circuit as claimed in claim 1 or 2, characterized in that the inverter (4) which connects said line carrying the logic combination to the gate of the propagation transistor (15) has its input connected to a source for a voltage having the high logic level via a transistor (5) whose polarity opposes that of the transistors of the logic and propagation network, and whose gate is connected to the output of said inverter.

* * * * *